(12) United States Patent
Turner (10) Patent No.: US 9,737,941 B2
(45) Date of Patent: Aug. 22, 2017

(54) HOLE SAW

(71) Applicant: Mark Turner, Arlington, TX (US)

(72) Inventor: Mark Turner, Arlington, TX (US)

(*) Notice: Subject to any disclaimer, the term of this patent is extended or adjusted under 35 U.S.C. 154(b) by 0 days.

(21) Appl. No.: 15/418,752

(22) Filed: Jan. 29, 2017

(65) Prior Publication Data

US 2017/0157688 A1 Jun. 8, 2017

Related U.S. Application Data

(63) Continuation of application No. 15/066,163, filed on Mar. 10, 2016.

(60) Provisional application No. 62/262,813, filed on Dec. 3, 2015.

(51) Int. Cl.
*B23D 49/11* (2006.01)
*B23D 49/00* (2006.01)

(52) U.S. Cl.
CPC ............ *B23D 49/11* (2013.01); *B23D 49/003* (2013.01)

(58) Field of Classification Search
CPC ...... B23D 49/11; B23D 49/003; B23D 51/16; B23B 51/0406; B23B 51/05; B27B 19/006; B27B 19/008
USPC ............... 30/392–394, 500–503.5, 301–303; D15/139; 408/204, 206
See application file for complete search history.

(56) References Cited

U.S. PATENT DOCUMENTS

| | | | |
|---|---|---|---|
| 803,368 A * | 10/1905 | Smith | B27F 5/12 144/81 |
| 2,482,439 A * | 9/1949 | Smith | B23B 51/0426 408/206 |
| 3,470,923 A * | 10/1969 | Besthorne | B23D 49/11 30/503.5 |
| 3,503,294 A | 3/1970 | Vinciguerra et al. | |
| 3,554,197 A * | 1/1971 | Dobbie | B23Q 5/027 30/392 |
| 3,706,474 A * | 12/1972 | Neuenburg | B23D 57/0076 30/277 |
| 3,837,230 A * | 9/1974 | Neuenberg | B27B 19/008 173/126 |
| 4,147,464 A * | 4/1979 | Watson | B23B 51/05 408/206 |
| 4,760,643 A * | 8/1988 | Juma | B23B 51/0426 30/166.3 |
| H000571 H * | 2/1989 | Hollinger | B23D 49/003 30/123.3 |
| 5,014,430 A * | 5/1991 | Wortham | B23D 51/01 30/166.3 |
| 5,048,190 A | 9/1991 | Aurness et al. | |

(Continued)

FOREIGN PATENT DOCUMENTS

| | | | | |
|---|---|---|---|---|
| DE | 433119 C * | 8/1926 | ............ | B27B 19/006 |
| DE | 574898 C * | 4/1933 | ............ | B27B 19/006 |

(Continued)

*Primary Examiner* — Jason Daniel Prone
(74) *Attorney, Agent, or Firm* — James L. Baudino (57) ABSTRACT

A hole saw includes a base member configured to secure the hole saw to a drive device, and a set of blade members extending from the base member. Each of the blade members is attached to the base member at a fixed position, and each of the blade members includes a sawing portion having cutting teeth. The sawing portion has a medial portion connected to the base member where the sawing portion has oppositely extending, freestanding distal ends.

16 Claims, 11 Drawing Sheets

(56) References Cited

U.S. PATENT DOCUMENTS

| | | | |
|---|---|---|---|
| 5,092,869 A * | 3/1992 | Waldron | A61B 17/15 606/82 |
| 5,456,011 A * | 10/1995 | Inkster | B23D 61/006 30/503.5 |
| 5,468,247 A * | 11/1995 | Matthai | A61F 15/02 30/339 |
| 5,651,646 A * | 7/1997 | Banke | B23B 51/0453 408/204 |
| 5,697,835 A * | 12/1997 | Nitz | B23D 61/006 30/353 |
| D391,974 S * | 3/1998 | Brutscher | D15/139 |
| D392,297 S * | 3/1998 | Brutscher | D15/139 |
| 5,797,189 A | 8/1998 | Gilbert | |
| 5,860,218 A | 1/1999 | Vinciguerra | |
| 5,867,913 A | 2/1999 | Pettigrew | |
| D406,223 S * | 3/1999 | Tran | D8/70 |
| D438,219 S * | 2/2001 | Brutscher | D15/139 |
| 6,283,843 B1 * | 9/2001 | Romagnoli | B23D 49/11 451/523 |
| 6,681,756 B1 * | 1/2004 | Kilpatrick | B25D 17/02 125/23.01 |
| 7,667,136 B2 * | 2/2010 | Dinh | H02G 1/00 174/50 |
| D639,833 S * | 6/2011 | Inkster | D15/139 |
| D681,081 S * | 4/2013 | Neal, Jr. | D15/139 |
| D681,082 S * | 4/2013 | Neal, Jr. | D15/139 |
| D727,380 S * | 4/2015 | Zhang | D15/139 |
| 9,358,623 B2 * | 6/2016 | Burks | B23D 49/003 30/500 |
| 2012/0125171 A1 | 5/2012 | Chen et al. | |
| 2012/0198709 A1 * | 8/2012 | Inkster | B27B 19/008 30/503.5 |
| 2014/0224091 A1 | 8/2014 | Sebhatu | |
| 2014/0338513 A1 | 11/2014 | Burks et al. | |
| 2015/0165633 A1 * | 6/2015 | Padget | B23D 61/006 30/353 |
| 2015/0343539 A1 * | 12/2015 | Hoop | B28D 1/041 408/204 |
| 2016/0279716 A1 * | 9/2016 | Gamboa Arias | B23B 51/0426 408/80 |
| 2017/0001252 A1 * | 1/2017 | Caroprese | B23D 49/11 408/24 |

FOREIGN PATENT DOCUMENTS

| | | | | |
|---|---|---|---|---|
| DE | 2120077 A1 * | 11/1972 | | B23D 57/0076 |
| DE | 2535112 A1 * | 2/1977 | | B23B 51/0426 |
| DE | 3940743 A1 * | 6/1991 | | B27B 19/006 |
| DE | 4036904 C1 * | 5/1992 | | B27B 5/32 |
| DE | 4425456 A1 * | 3/1996 | | A61B 17/1637 |
| DE | 29604965 U1 * | 6/1996 | | B23D 45/165 |
| EP | 0881023 A2 * | 12/1998 | | B23D 49/11 |
| EP | 1240872 A2 * | 9/2002 | | A61B 17/142 |
| EP | 2987577 A1 * | 2/2016 | | B23B 51/0406 |
| FR | 604454 A * | 5/1926 | | B27B 19/008 |
| FR | 1412153 A * | 9/1965 | | B23D 61/006 |
| FR | 2704790 A1 * | 11/1994 | | B23B 31/16012 |
| JP | 04269117 A * | 9/1992 | | B27B 19/006 |
| JP | 2000107919 A * | 4/2000 | | |
| JP | 2010247306 A * | 11/2010 | | |
| WO | WO 2007049012 A1 * | 5/2007 | | B23B 1/0426 |
| WO | WO 2007086767 A1 * | 8/2007 | | B23D 49/11 |
| WO | WO 2008061835 A1 * | 5/2008 | | B23D 61/006 |
| WO | WO 2013113432 A1 * | 8/2013 | | B23D 61/006 |

* cited by examiner

HOLE SAW

BACKGROUND

Hole saws are generally used to make cut-outs, holes and/or openings in materials such as wood, fiberglass, plastic, drywall, etc. Holes saws are generally used with a power drill or other type of rotary power drive unit. Hole saws typically include a saw cup, an arbor and a pilot bit. The saw cup includes a threaded portion to receive a threaded end portion of the arbor. The pilot bit protrudes from the cutting edge of the saw to guide the saw during cutting. The arbor is generally inserted into a chuck of the power drill. The saw body is coupled to the pilot bit for rotation with the pilot bit, and the saw body includes a collection of teeth to form a cutting edge. In operation, the power drill causes rotation of the hole saw, and the drill bit first cuts into a structure to establish a pilot hole to maintain the hole saw concentric to a particular point. The cutting edge of the saw body then cuts a relatively larger opening in the structure.

BRIEF SUMMARY

According to one aspect of the present disclosure, a hole saw is disclosed. The hole saw includes a base member configured to secure the hole saw to a drive device; and a set of blade members extending from the base member, each blade member including a sawing portion having cutting teeth, the sawing portion having a medial portion connected to the base member, the sawing portion having oppositely extending, freestanding distal ends.

According to another embodiment of the present disclosure, a hole saw includes a base member supporting a set of blade members, each blade member having cutting teeth, the blade members arranged in a non-circular relationship relative to each other, and wherein a distance between the cutting teeth and the base member varies along a longitudinal direction of the respective blade members;

According to another embodiment of the present disclosure, a hole saw includes a base member supporting a set of blade members, each blade member having a sawing portion with cutting teeth, the sawing portion having a medial portion and oppositely disposed distal ends, and wherein a distance between the cutting teeth and the base member at the medial portion is greater than at the distal ends.

BRIEF DESCRIPTION OF THE SEVERAL VIEWS OF THE DRAWINGS

For a more complete understanding of the present application, the objects and advantages thereof, reference is now made to the following descriptions taken in conjunction with the accompanying drawings, in which.

DETAILED DESCRIPTION

Embodiments of the present disclosure provide a hole saw that may be used to form a variety of sizes and/or shapes of holes and/or openings in a structure. According to one embodiment, a hole saw includes a base member configured to secure the hole saw to a drive device; and a set of blade members extending from the base member, each blade member including a sawing portion having cutting teeth, the sawing portion having a medial portion connected to the base member, the sawing portion having oppositely extending, freestanding distal ends. In some embodiments, the hole saw may be attached to an oscillating power tool or oscillating drive device. The oscillating drive device vibrates the hole saw back and forth in a narrow arc (e.g., approximately 3°-4°) and causes the hole saw to create an opening in a structure corresponding to the locations/orientations of the blade members relative to each other.

Figure 1:
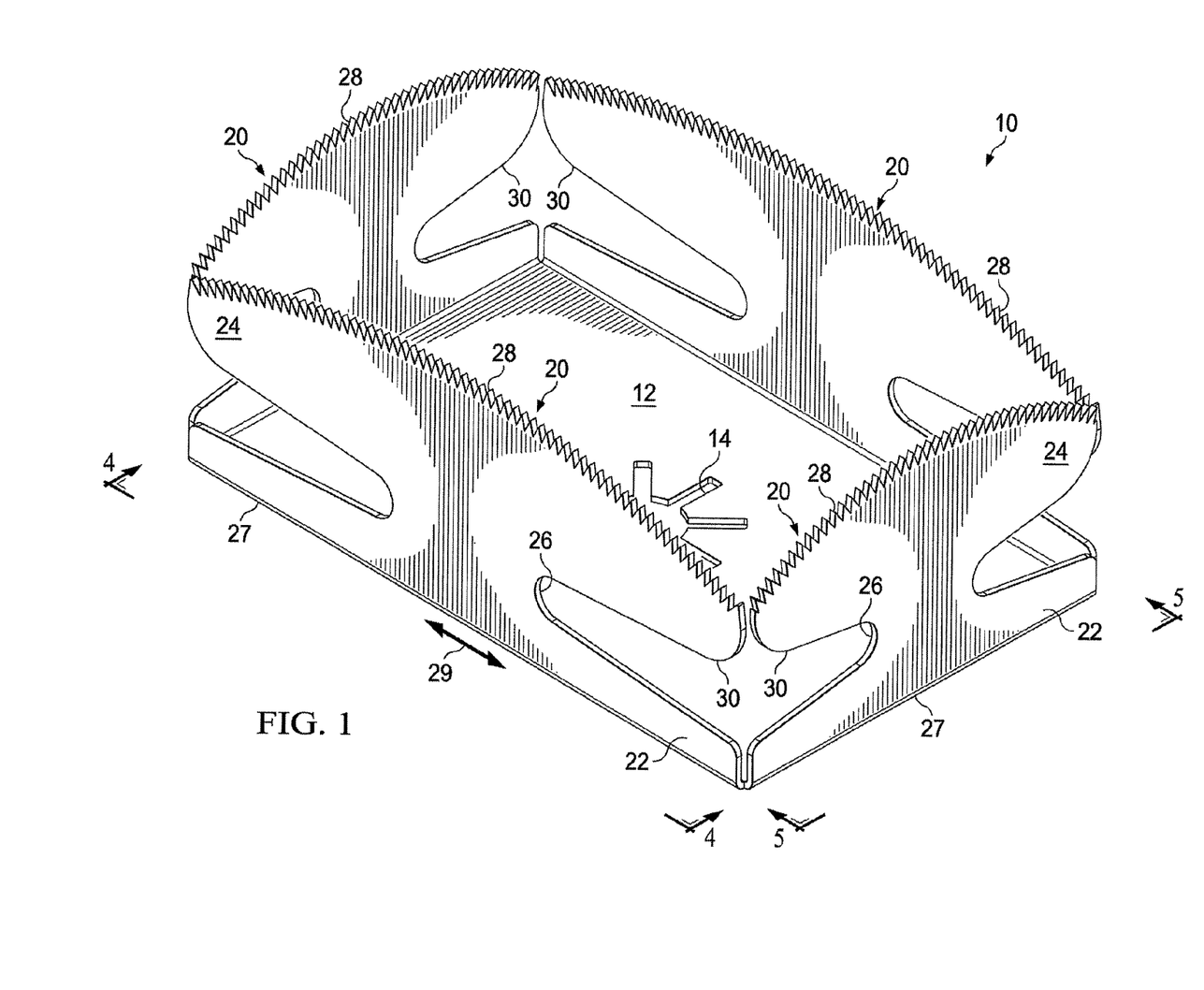
FIG. 1 is a diagram illustrating a top perspective view of a hole saw according to the present disclosure.
Figure 2:
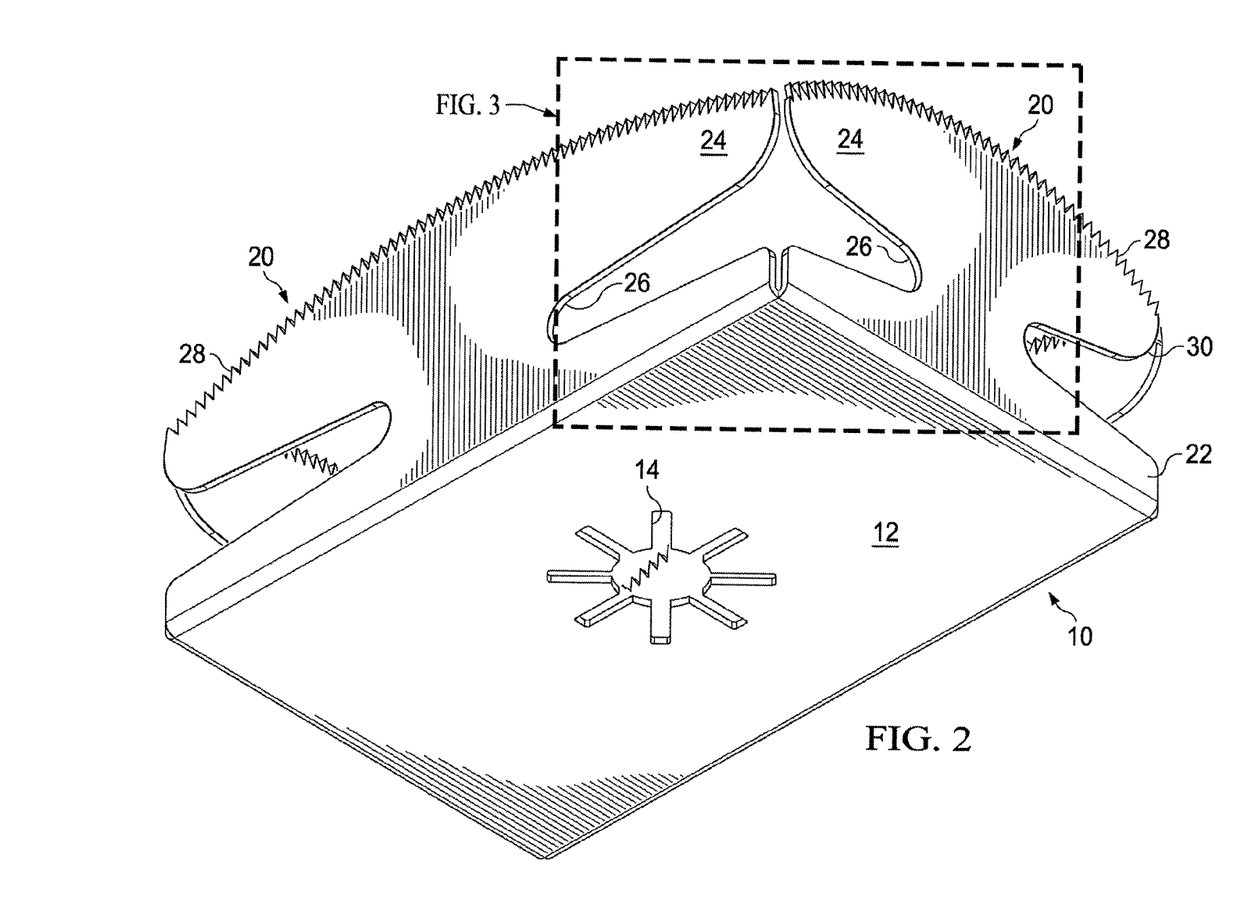
FIG. 2 is a diagram illustrating a bottom perspective view of the hole saw of FIG. 1 according to the present disclosure.
Figure 3:
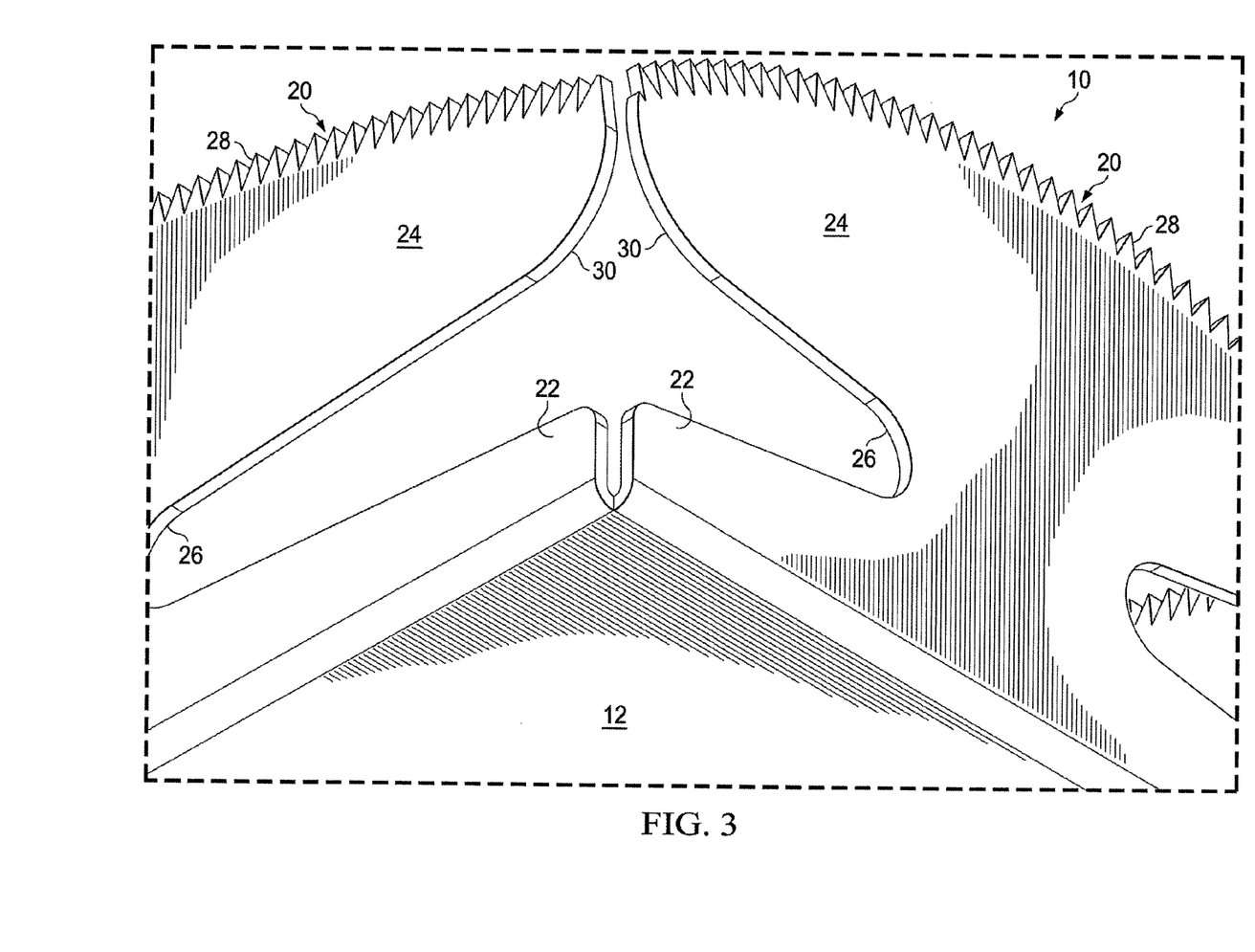
FIG. 3 is a diagram illustrating an enlarged view of a portion of the hole saw of FIG. 2 according to the present disclosure.
Figure 4:
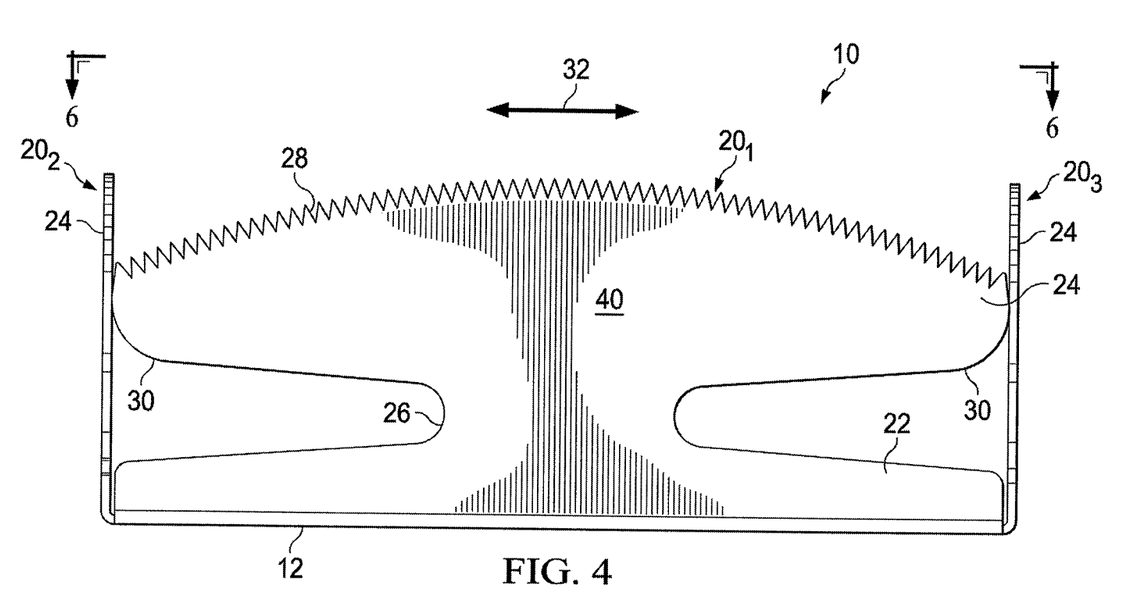
FIG. 4 is a diagram illustrating a view of the hole saw of FIG. 1 taken from the line 4-4 of FIG. 1.
Figure 5:
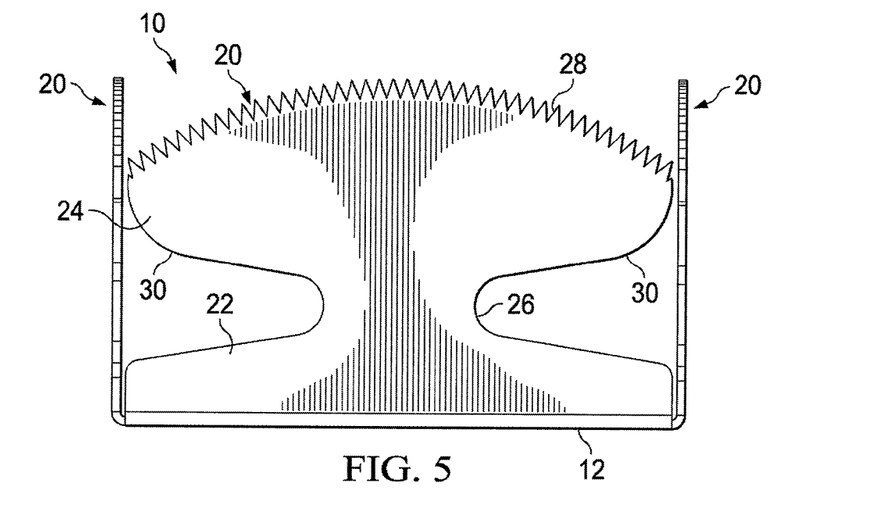
FIG. 5 is a diagram illustrating a view of the hole saw of FIG. 1 taken from the line 5-5 of FIG. 1.
Figure 6:
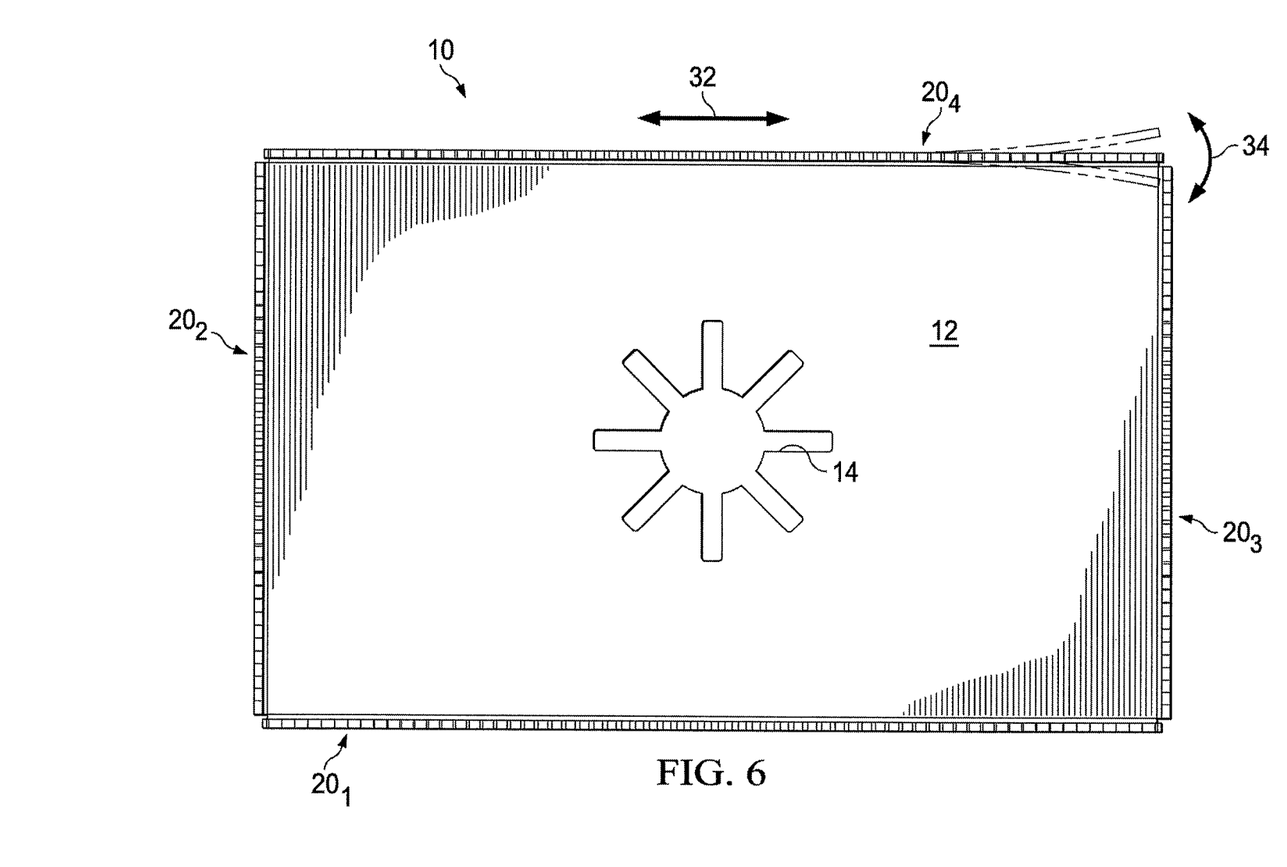
FIG. 6 is a diagram illustrating a top view of the hole saw of FIG. 1 taken from the line 6-6 of FIG. 4.

With reference now to the Figures and in particular with reference to FIGS. 1-6, diagrams illustrating a hole saw 10 according to the present disclosure is illustrated. FIG. 1 is a diagram illustrating a top perspective view of hole saw 10 according to the present disclosure; FIG. 2 is a diagram illustrating a bottom perspective view of hole saw 10 of FIG. 1 according to the present disclosure; FIG. 3 is a diagram illustrating an enlarged view of a portion of hole saw 10 of FIG. 2 according to the present disclosure; FIG. 4 is a diagram illustrating a view of hole saw 10 of FIG. 1 taken from the line 4-4 of FIG. 1; FIG. 5 is a diagram illustrating a view of hole saw 10 of FIG. 1 taken from the line 5-5 of FIG. 1; and FIG. 6 is a diagram illustrating a top view of hole saw 10 of FIG. 1 taken from the line 6-6 of FIG. 4.

In the illustrated embodiment, hole saw 10 is configured to create a rectangular opening in a wall or other structure. However, it should be understood that hole saw 10 may be differently configured to create other sizes and/or shapes of openings (e.g., triangular, hexagonal, octagonal, etc.) based on the locations and/or orientations of the cutting blades of hole saw 10 relative to each other, as described in further detail below.

In the illustrated embodiment, hole saw 10 includes a base member 12 for securing hole saw 10 to a drive device (e.g., an oscillating drive device capable of vibrating and/or moving hole saw 10 back and forth in a narrow arc (e.g., approximately 3°-4°)). For example, in some embodiments, hole saw 10 is releasably securable to a drive device such as an oscillating power tool. In the illustrated embodiment, base member 12 includes an opening 14 configured to enable the releasable attachment of hole saw 10 to such drive device. It should be understood that hole saw 10 and/or base member 12 may be otherwise configured to facilitate attachment to different types of drive devices. Also, it should be understood that hole saw 10 may be configured as a permanent and/or non-removable component of a drive device.

In the illustrated embodiment, hole saw 10 includes a number or set of blade members 20 extending upwardly from base member 12 (e.g., away from the drive device and toward a wall/structure in which an opening is desired). Blade members 20 are located and/or positioned relative to base member 12 to provide a desired size and/or shape of opening in a wall/structure. For example, in the illustrated embodiment, hole saw 10 includes four blade members 20, and each located and extending upwardly at an approximate right angle from a different side of base member 12. However, it should be understood that blade members 20 may be at different angles relative to base member 12 (e.g., to produce a tapered plug having slanted/angled cuts through a structure). In the illustrated embodiment, each blade member 20 is positioned at approximately a right angle (or orthogonally) relative to an adjacent blade member 20 to enable the creation of a rectangular opening in a wall/structure. However, as described above, the number of blade members 20 and/or positions relative to each other may be varied to create a different size/shape opening in a structure (e.g., three blade members 20 to create a triangular opening).

In the illustrated embodiment, each blade member 20 includes a stabilizing portion 22 located near and connected to base member 12, and a sawing portion 24 connected to stabilizing portion 22 via a necked down or reduced width extender portion 26. For example, in the illustrated embodiment, stabilizing portion 22 extends substantially the entire length of a respective edge 27 of base member 12 and extends upwardly away from base member 12 to a height to provide a sufficient level of rigidity and/or stability for the respective blade member 20. As illustrated in the figures, each sawing portion 24 includes cutting teeth 28 extending along an uppermost edge of sawing portion 24 for cutting into a corresponding wall/structure. Sawing portion 24 extends a distance approximately equal to a distance of a corresponding side of a desired opening size/shape in the wall/structure.

In the illustrated embodiment, extender 26 is located approximately medially relative to a length or longitudinal distance of stabilizing portion 22 (e.g., measured in a direction indicated by 29). Sawing portion 24 extends upwardly from extender 26 and extends distally therefrom in opposite directions to have oppositely disposed (i.e., at opposite ends thereof) freestanding ends 30 (i.e., separated from and/or spaced apart from corresponding locations of stabilizing portion 22). In the illustrated embodiment, sawing portion 24 is configured to have distally located, freestanding ends 30 to enable ends 30 to be flexible to facilitate transverse movement thereof relative to a longitudinal cutting direction of sawing portion 24. For example, as best illustrated on FIGS. 4 and 6, the illustrated hole saw 10 includes four blade members 20 (blade members $20_1$, $20_2$, $20_3$ and $20_4$). For ease of description, the operation and/or movement of blade member $20_1$ will be described; however, it should be understood that the operation and/or movement described is equally applicable to blade members $20_2$-$20_4$. The cutting portion 24 of blade member $20_1$ is configured to cut into a structure along a longitudinal direction 32 (e.g., aligned with the longitudinal direction of the respective blade member 20). Free ends 30 of cutting portion 24 are spaced apart from and/or separated from proximate portions of stabilizing portion 22 to enable lateral and/or transverse movement of ends 30 relative to direction 32 (e.g., movement of ends 30 in a direction 34). For example, if a medial portion of cutting portion 24 (e.g., near extender 26) is held firmly, ends 30 may move or flex in a direction 34 relative thereto because of the unsupported nature of ends 30. It should be understood that the distal ends 30 of each blade member 20 may flex in a direction similar to direction 34 based on the respective blade member 20.

As best illustrated in FIG. 3, ends 30 of adjacent sawing portions 24 are disconnected from each other to enable independent movement thereof relative to each other. In the illustrated embodiment, ends of adjacent stabilizing portions 22 are also disconnected from each other; however, it should be understood that ends of adjacent stabilizing portions 22 may also be connected to each other to provide increased rigidity of corresponding blade members 20. It should also be understood that in some embodiments, stabilizing portion 22 may be omitted if extender 26 provides suitable strength, stiffness and/or rigidity to support cutting portion 24. Thus, in such an embodiment, ends 30 of cutting portion 24 would be spaced apart from base member 12 to enable ends 30 to move laterally/transversely relative to a longitudinal cutting direction of a respective cutting blade 20. Thus, extender 26 connects a medial portion of cutting portion 24 to stabilizing portion 22 and/or base member 12 while also being a cantilever support for freestanding or unsupported distal ends 30 of cutting portion 24.

Referring to FIG. 4, cutting portion 24 is configured such that a medial portion or location 40 of cutting portion 24 extends upwardly away from base member 12 a greater distance than distal ends 30. For example, In the illustrated embodiment, the upper edge of cutting portion 24 containing teeth 28 is arcuately formed such that the upper cutting edge of cutting portion 24 curves downwardly from medial location 40 towards distal ends 30. However, it should be understood that the upper edge of cutting portion 24 may also be otherwise formed (e.g., extending linearly downward from medial location 40 toward distal ends 30). Thus, a distance from base member 12 to the cutting teeth 28 is greater at medial location 40 of blade member 20 than at distal ends 30. In other words, the distance from the cutting teeth to the base 12 varies along a longitudinal length/direction of the respective cutting blade (e.g., decreasing toward the distal ends 30).

Figure 7A:
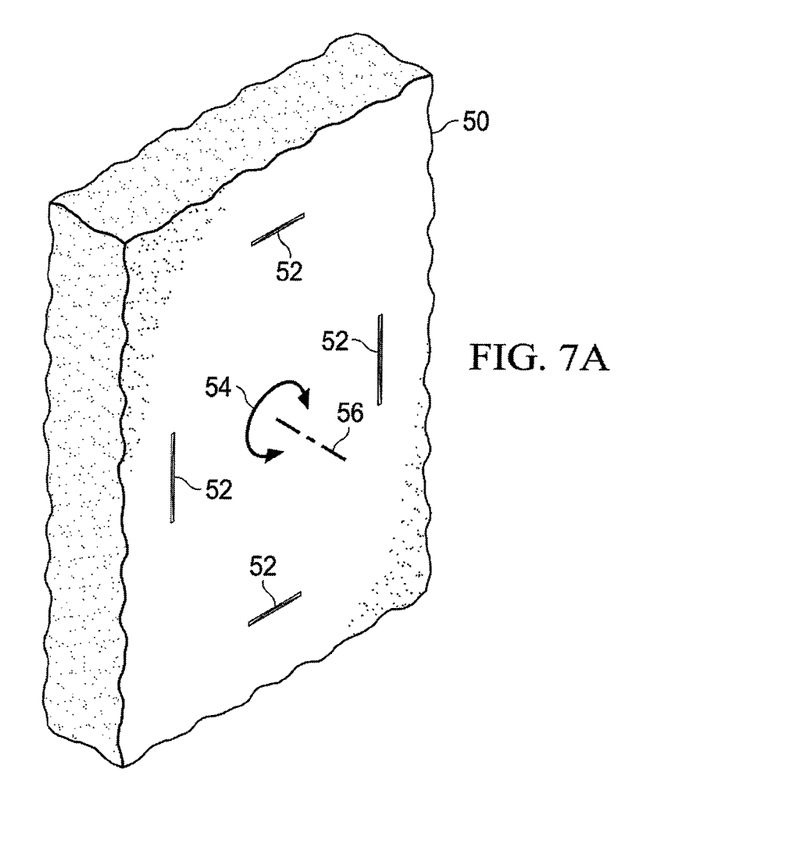
FIGS. 7A-7C are diagrams illustrating progressive stages of cuts formed in a structure during a cutting process/operation using the hole saw of FIGS. 1-6 according to the present disclosure.
Figures 7B, 7C:
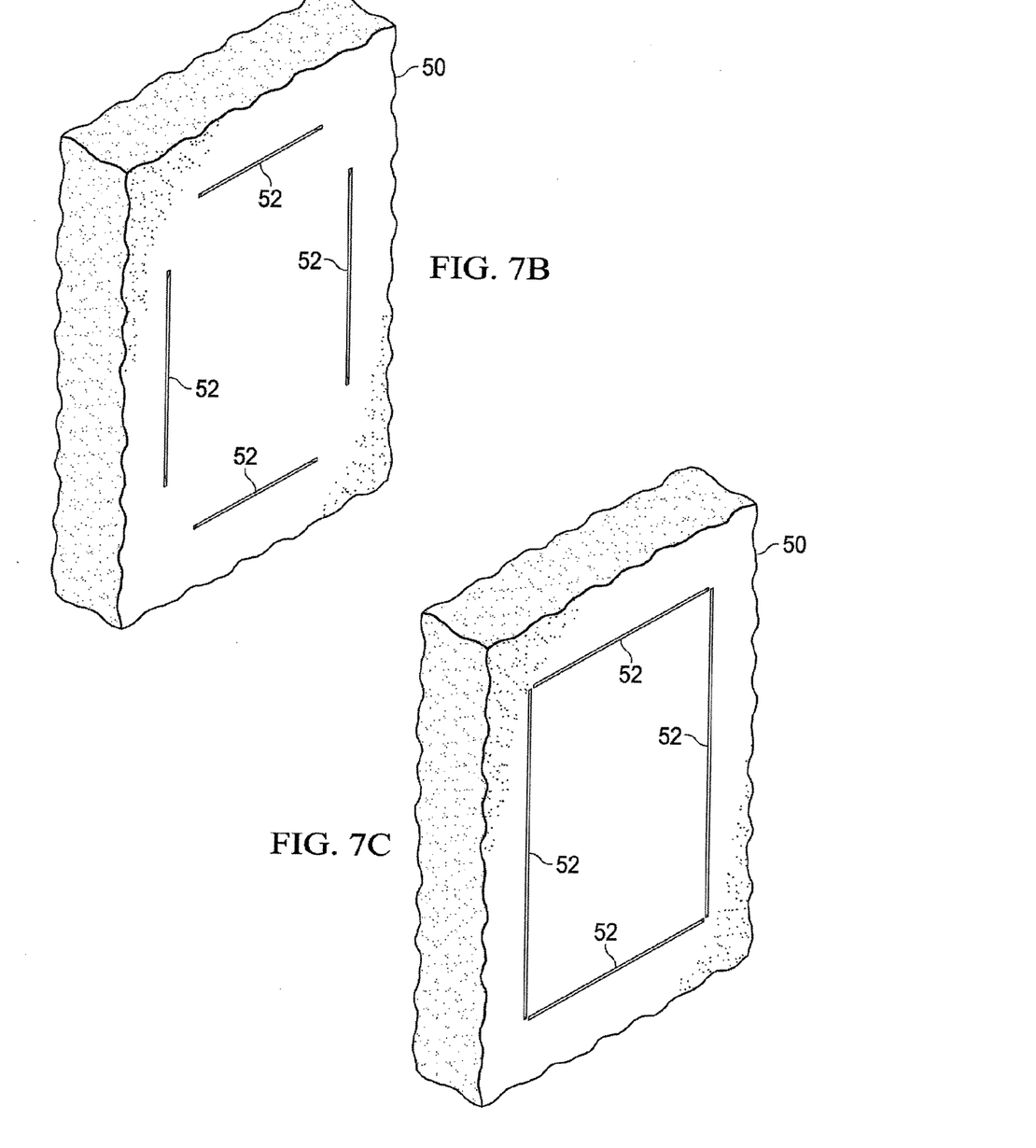
Figure 8A:
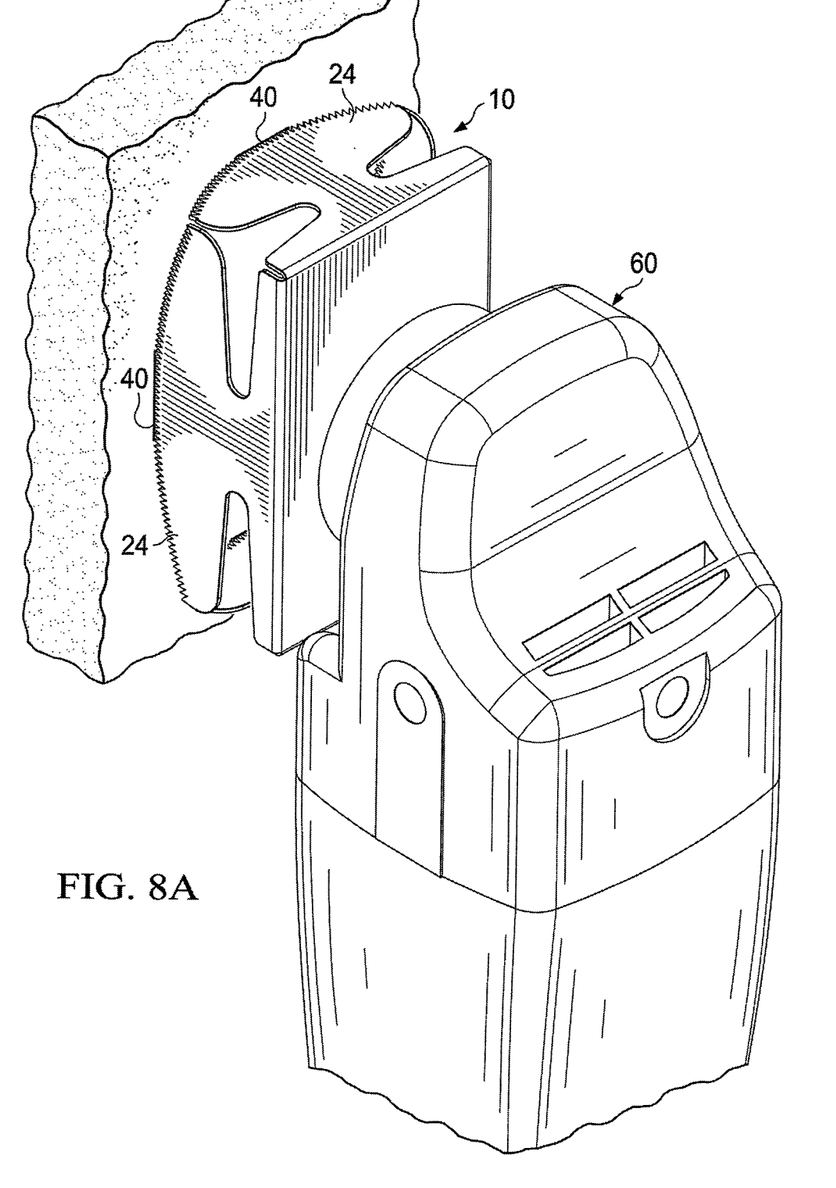
FIGS. 8A-8C are diagrams illustrating the hole saw of FIG. 1-6 attached to a drive device and performing the cutting process/operation depicted in FIGS. 7A-7C.
Figure 8B:
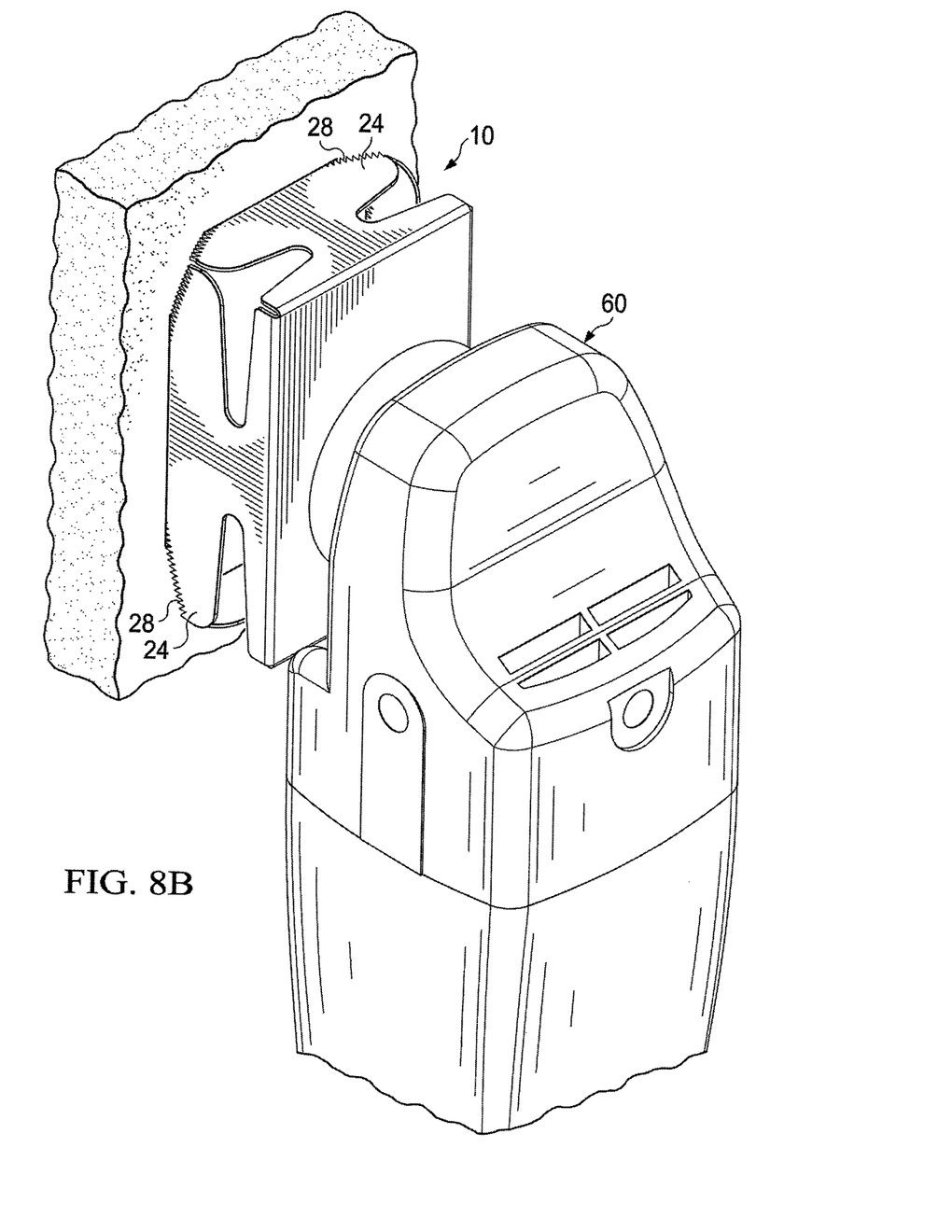
Figure 8C:
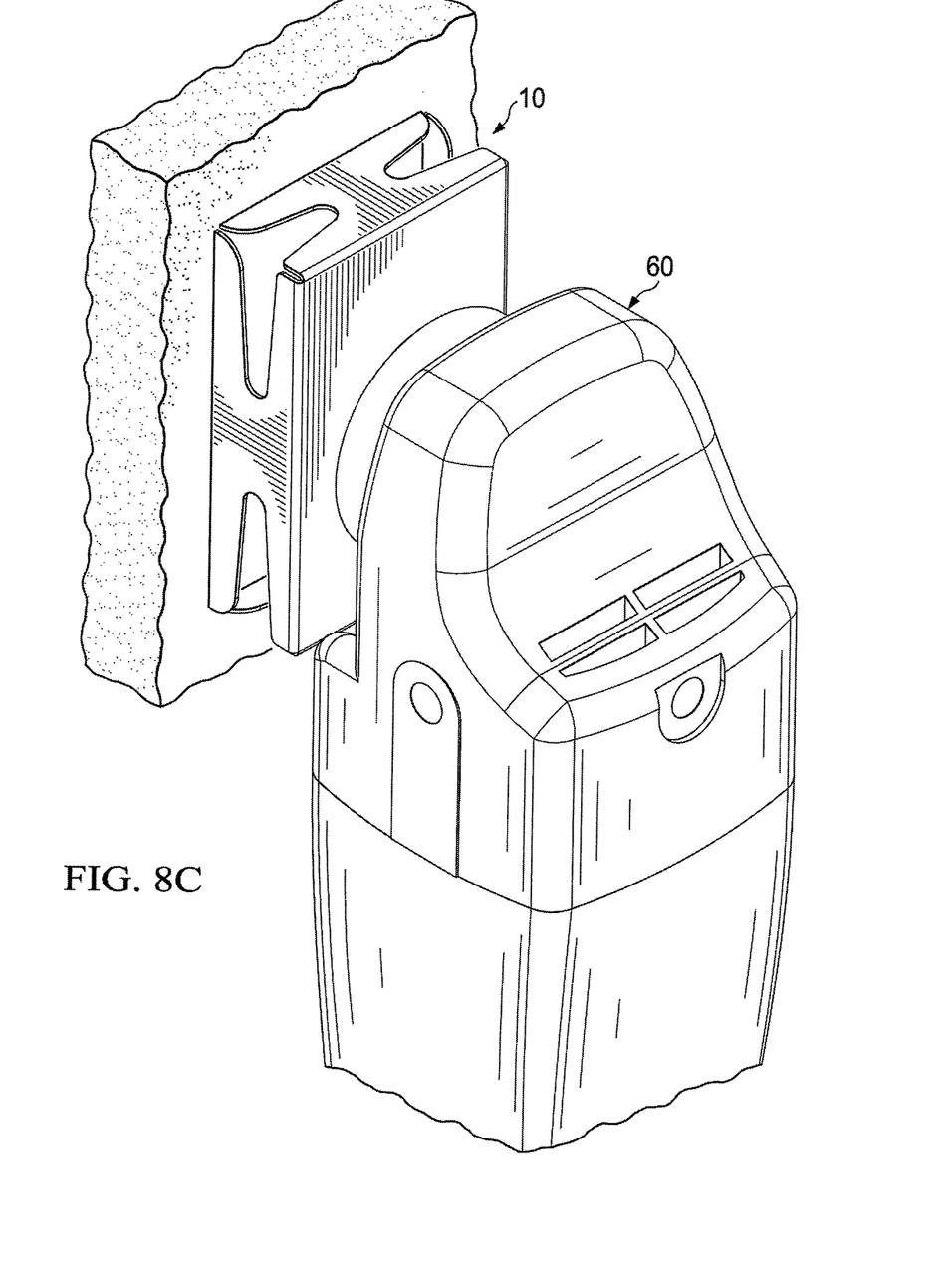
Figure 9:
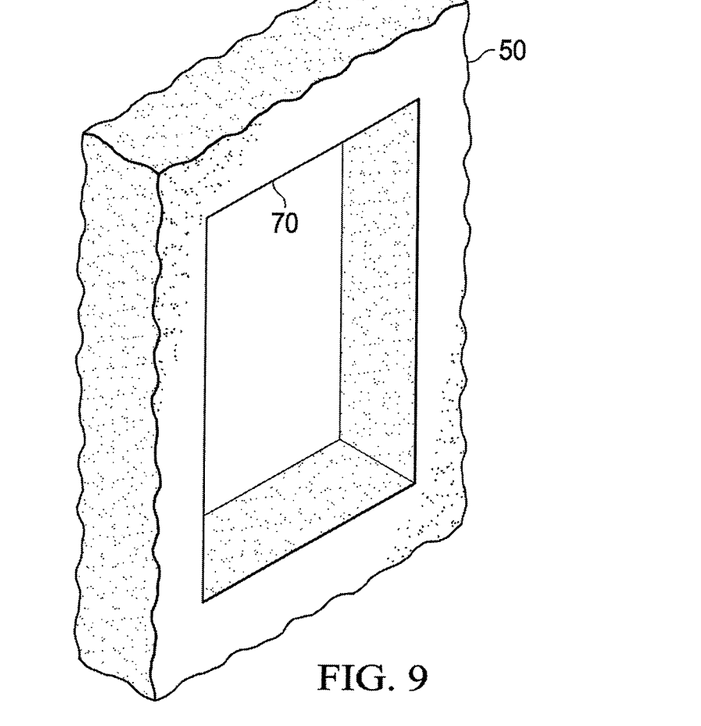
FIG. 9 is a diagram illustrating a hole formed in a structure using the hole saw of FIG. 1-6 resulting from the cutting process/operation depicted in FIGS. 7A-7C and 8A-8C according to the present disclosure.

FIGS. 7A-7C are diagrams illustrating progressive stages of cuts formed in a structure during 50 of a cutting process/operation using hole saw 10 of FIGS. 1-6 according to the present disclosure; FIGS. 8A-8C are diagrams illustrating hole saw 10 of FIG. 1-6 attached to an oscillating drive device 60 and performing the cutting process/operation depicted in FIGS. 7A-7C; and FIG. 9 is a diagram illustrating a hole or opening 70 formed in structure 50 using hole saw 10 of FIGS. 1-6 resulting from the cutting process/operation depicted in FIGS. 7A-7C and 8A-8C according to the present disclosure. In operation, hole saw 10 is placed against structure 50. For example, with hole saw 10 connected to drive device 60, medial locations 40 of sawing portions 24 are initially in contact with the structure 50. As force is applied to hole saw 10 toward the structure 50, teeth 28 begin cutting into the structure 50 in the region of medial locations 40. For example, FIG. 7A is a diagram depicting a surface of structure 50 during an initial phase of the sawing process where teeth 28 have formed initial cuttings or cut paths 52 into the structure 50. With the oscillating drive device 60, hole saw 10 is generally subject to vibrational and/or rotational movement relative to the structure 50. For example, an oscillating drive tool may produce 2°-4° of rotational movement in direction 54 relative to an axis 56. However, at medial locations 40, the rotational movement is substantially tangential to the longitudinal cutting direction of a respective sawing portion 24, thereby essentially producing a linear and/or non-rotational cutting path 52 into the structure 50.

As the cutting process continues and continued force is applied to hole saw 10 toward the structure 50, further portions of teeth 28 located distally from medial locations 40 begin to contact and cut into the structure 50. For example, FIG. 7B is a diagram illustrating the structure after further cutting with hole saw 10 such that the length of cuttings 52 have increased due to additional cutting teeth 28 distal from medial locations 40 coming into contact with the structure 50. Because portions of sawing portion 24 extending distally from medial location 40 become or are separated from stabilizing portion 22, such portions of sawing portion 24 are free to flex and move relative to the medial location 40 (e.g., the distal portions may move laterally/transversely relative to a respective cutting direction of the respective saw blade 20). Thus, in operation, as hole saw 10 moves into the structure, even though the hole saw 10 is being rotationally moved/driven, flexible and/or distal portions of the sawing portions 24 follow the initially formed cuttings 52 which are formed in a longitudinal direction aligned with the respective blade members 20 due to the flexibility of the distal portions of the cutting portions 24. Thus, as hole saw 10 continues to move inward and cut into the structure 50, further portions of cutting portions 24 toward distal ends 30 cut into the structure and follow the previously formed cuttings 52, as depicted in FIG. 7C. Thus, despite the oscillating and/or rotational movement of the hole saw 10 in general relative to the structure 50 (e.g., from drive device 60), the flexible portions of the cutting portions 24 located distal to medial locations 40 enable such cutting portions 24 to flex to follow the previously formed cuttings 52 and create such cuttings 52 corresponding to the overall size and/or shape formed by the blade members 20. Accordingly, in operation, the cutting portions 24 of the hole saw 10 enable rotational movement of the hole saw 10 in general to be changed and/or translated into a linear cutting motion corresponding to the longitudinal direction of each respective blade member 20.

Thus, in operation, as the distance from the medial location 40 of the cutting portions 24 toward distal ends 30 increases, the sawing portion 24 becomes increasingly flexible to enable those distal portions of the blade members 20 to flex and follow the earlier formed cutting paths 52 even though the hole saw is being oscillated/rotated relative to the structure. Generally, forming blade members 20 as described herein enables the rotational movement of hole saw 10 to be translated into a linear cutting motion corresponding to the shape/design of the respective blade member 20.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A hole saw, comprising:
    a base member configured to secure the hole saw to a drive device; and
    first and second pairs of blade members extending orthogonally from the base member, the blade members of the first pair disposed parallel to each other, the blade members of the second pair disposed parallel to each other, the first pair disposed orthogonally to the second pair, the base member and the first and second pairs forming an open-sided boxed-shaped hole saw, each of the blade members are attached to the base member in a fixed position relative to the base member, each of the blade members having cutting teeth defining a cutting direction, each of the blade members having oppositely extending, freestanding distal ends, each blade member having a reduced width in the cutting direction located between the cutting teeth and the base member.

2. The hole saw of claim 1, wherein the cutting teeth of each blade member define an arcuately-shaped edge.

3. The hole saw of claim 1, wherein each of the blade members includes a medial portion and in each of the blade members a group of the cutting teeth located near the medial portion are located a greater distance from the base member than a group of the cutting teeth located near the distal ends.

4. The hole saw of claim 1, wherein each of the blade members includes a sawing portion having the cutting teeth and defining the distal ends and an extender portion defining the reduced width and being disposed between the sawing portion and the base member.

5. The hole saw of claim 1, wherein each of the blade members include: a sawing portion having the cutting teeth and the distal ends, wherein the distal ends define a saw portion linear width; a stabilizer portion connected to the base member and having a stabilizer portion linear width substantially parallel to the saw portion linear width; and an extender portion defining the reduced width and connecting the sawing portion and the stabilizer portion.

6. A hole saw, comprising:
    a base member supporting first and second pairs of blade members, each blade member having cutting teeth extending in a cutting direction, the first pair of blade members arranged in a non-circular relationship relative to the second pair of blade members, and wherein a distance between the cutting teeth and the base member varies along the cutting direction, and wherein each of the blade members is disposed orthogonal to the base member and includes:
    a stabilizer portion connected to the base member;
    a sawing portion having the cutting teeth, the sawing portion and the stabilizer portion each extending a length in the cutting direction; and
    an extender portion extending between and connecting the sawing portion and the stabilizer portion, wherein a length of the extender portion in the cutting direction is less than the lengths of the stabilizer portion and the sawing portion.

7. The hole saw of claim 6, wherein the sawing portion has oppositely disposed, freestanding distal ends.

8. The hole saw of claim 7, wherein the distance in each of the blade members at a medial location of the sawing portion is greater than the distance at distal ends.

9. The hole saw of claim 6, wherein the first pair of blade members are located orthogonal to the second pair of blade members.

10. The hole saw of claim 6, wherein the cutting teeth of each of the blade members define an arcuate edge.

11. The hole saw of claim 6, wherein the extender portion is medially located relative to the sawing portion and the stabilizer portion.

12. The hole saw of claim 6, wherein the sawing portion has oppositely disposed, freestanding distal ends located in spaced apart relationship from distal ends of the stabilizer portion, the sawing portion configured to enable the distal ends of the sawing portion to flex laterally relative to the cutting direction independently of the distal ends of the stabilizer portion.

13. A hole saw, comprising:
a base member supporting first and second pairs of blade members extending perpendicular to the base member, the blade members of the first pair disposed parallel to each other, the blade members of the second pair disposed parallel to each other, the first pair disposed orthogonally to the second pair, each of the blade members having a sawing portion with cutting teeth defining the cutting direction, the sawing portion having oppositely disposed distal ends, each blade member having a reduced width in the cutting direction located between the cutting teeth and the base member, and wherein in each of the blade members a distance between the cutting teeth and the base member at a medial location of the sawing portion relative to the cutting direction is greater than at the distal ends, and wherein in each of the blade members the distal ends are configured to flex transversely relative to the cutting direction, and wherein the base member is configured to be fixedly coupled to a drive device to enable the base member to rotationally oscillate relative to a structure in response to receiving oscillating, rotational movement via the drive device, the rotationally oscillating movement of the base member causing each of the blade members to simultaneously create a linear cut through the structure.

14. The hole saw of claim 13, wherein the cutting teeth of each of the blade members define an arcuately-shaped edge.

15. The hole saw of claim 13, wherein the sawing portion is connected to the base member via an extender portion and the extender portion defines the reduced width.

16. The hole saw of claim 13, wherein each of the blade members further include a stabilizer portion connected to the base member; and a necked-down extender portion defining the reduced width and connecting the sawing portion and the stabilizer portion.

* * * * *